3,749,692
AQUEOUS LATEX CAULKING COMPOSITION
Peter C. Scocos, Willowick, and Frank L. Miller, Warrensville Heights, Ohio, assignors to SCM Corporation, Cleveland, Ohio
No Drawing. Filed June 22, 1971, Ser. No. 155,635
Int. Cl. C08d 11/02; C08f 45/28; C09d 5/02
U.S. Cl. 260—29.6 MH
5 Claims

ABSTRACT OF THE DISCLOSURE

In a plasticized aqueous latex caulk containing solid filler paintability of the cured surface can be improved by using as about 60–80 weight percent of the plasticizer components a polybutene having average molecular weight of about 400–500, viscosity of about 150–300 centistokes at 100° F., and pour point not substantially higher than about −20° F.

---

This invention relates to an improvement in aqueous latex caulk compounded with filler and plasticizer. This type of composition sometimes also is referred to as a sealant. The material is used to seal apertures such as joints in structures in field construction or in the shop. The caulk often is applied by gun or knife, and sometimes is shaped by hand or tool for obtaining desired exposed surface conformation.

In addition to aqueous latex caulks recent technology has provided the trade with so-called "100% solids" caulks wherein the main curing is done by catalyzed polymerization rather than by evaporation, and various caulks in which the vehicle is mixed with volatile organic solvent for cure by evaporation, and no or virtually no water is present, e.g., butyl rubber caulks. Both these sorts of caulks generally exhibit good adhesion to the substrates to which they are applied. This is particularly the case with butyl rubber solvent-type caulks, and hence such type particularly can tolerate, with little adverse effect on adhesion, a variety of ingredients which might otherwise detract from adhesion such as polybutenes; polybutenes have been suggested for incorporation into such solvent-type caulks.

An aqueous latex caulk generally is compounded from an acrylic latex, although latices of polyvinyl acetate polymers and copolymers predominating in polyvinyl acetate, and even some selected styrene butadiene copolymers in aqueous latex form can be used for compounding the vehicle portion. Usually such latex will contain between about 45% and about 55% latex solids by weight. The latter two types of vehicles generally are used only for interior exposure whereas the acrylic latices have proven to be quite desirable for exterior as well as interior caulking. Typically such acrylic latices are relatively low molecular weight polymers (e.g., molecular weight below about 50,000) formed by addition copolymerization of preponderantly ethyl acrylate with a minute proportion of carboxylic acid-providing units such as acrylic or methacrylic acid. They are sold for caulk and sealant compounding under the trademarks "Rhoplex LC-40" (Rohm & Haas Company), "UCAR 153" (Union Carbide Corporation), and "Polymax CK24" (T. F. Washburn Company). It has been customary to use in aqueous latex caulks ester-type plasticizers, e.g., dioctyl phthalate, diisooctyl phthalate, dioctyl adipate, dibutyl sebacate, dipropylene glycol dibenzoate, etc., and chlorinated polyphenyl types to obtain good adhesion, flexibility and elasticity.

We have now found that improved paintability of aqueous latex caulks with quite good adhesion can be made when 60–80% by weight of the plasticizer is a polybutene having average molecular weight of from 400–500, viscosity of 150–300 centistokes at 100° F., and pour point of at least −20° F. This is surprising because polybutenes of this type have the reputation for substantially decreasing the adhesion of caulks to substrates. Significantly less of such polybutene detracts from paintability of the caulk, and significantly more from necessary adhesiveness to substrates. Lower molecular weight polybutenes are too volatile and contribute to undesirable shrink and possible extraction; higher molecular weight ones contribute undesirable stiffness for preparation and use.

It is generally desired in an aqueous latex caulk that it is fairly flexible to take account modest moving, flexing, expansion, and contraction of the joint in a structure to which it is applied. Ordinarily the caulk should "skin over" upon drying in ordinary air in about 6–8 hours so that it can be painted along with the rest of the structure. We find that our particular polybutene plasticization gives good low gloss for painting, and the plasticizer is not easily extracted into a paint film, these properties being substantially superior to aqueous latex caulks plasticized with the conventional ester and/or chlorinated polyphenyl-type plasticizers, which themselves are used in conjunction with the polybutene to provide satisfactory adhesiveness to the substrate. Other conventional plasticizing components can also be used.

Flexibility and elasticity can be measured in a small piece of caulk cured in sandwich conformation between a flat glass plate and a flat aluminum alloy plate or a flat concrete panel. Typically these dissimilar substrates attach to the opposite ½ inch high sides of the caulk piece, that itself is ½ inch wide and 2 inches long. The assembly is stretched at 75° F. by a factor of 25% on the ½ inch axis normal to and between the two substrates using, for example, an Aymar extension machine or an Instron tensile strength tester equipped with jaws appropriate for accommodating the assembly, then measuring the degree of recovery to original dimension.

The latices for the instant caulks generally are marketed at about 55% by weight latex solids. In the instant caulk we use between 10–20% latex solids based on the final caulk composition. On the same basis we use 45–70% solid filler consitituents, 10–18% volatile constituents, and 10–20% plasticizer constituents, advantageously with 65–75% of the plasticizer constituents present being the polybutene specified above.

The customary fillers are pulverized calcium carbonate, silica, talc, mica and asbestos or other solid filler material including organic materials on occasion. Calcium carbonate is a preferred filler for color and to give stiffness to the body of caulk at low cost, whereas silica, also a preferred filler, permits a higher filler loading (and thus less shrinkage) at low cost without so much bodying. While the silica and calcium carbonate did not ordinarily give extremely dark colors (which are hard to hide with paint), it is often desirable and customary to include a white opacifying pigment such as titanium dioxide in minute proportion so that thin, one-coat paint coverage can be achieved readily.

The volatiles in aqueous latex caulk are preponderantly water with a minor fraction, relative to the water, of an organic solvent or a mixture of organic solvents, none of which have initial boiling point substantially above 200° C. The most common ones are much more volatile than that such as low-boiling petroleum naphthas, alcohols and ketones. Total volatiles comprise 90–95% or even more water by weight. Minute amounts of wetting agents and surfactants are incorporated to help wet out the pigments, stabilize the emulsion, and facilitate the dispersion of the pigments in the caulking composition. Tints and colorants can be used, but ordinarily are not because the surface usually is to be painted over.

Many caulks are made in conventional mixers such as paddles with stationary fingers. The heavier, stiffer caulks often are made in dough mixers and the other mixers generally designed for blending heavy pastes. Mixing temperatures for aqueous latex caulks should not be below about 65–70° F. to mix in efficiently various fluent ingredients, and a practical upper limiting temperature for the mixing operation often is about 120° F., although higher temperatures can be used if desired.

For general sealing application such as windows, doors, and flush seams, our caulk will comprise 15–20% latex solids, 40–55% filler constituents, 14–18% volatile constituents, and 14–20% plasticizer constituents, advantageously with 65–75% of the plasticizer constituents present being the polybutene specified above. The calcium carbonate to silica weight ratio will be between about 1.5:1 and about 2:1. Such material usually is applied as a bead from a gun and left in place to dry and skin over to yield a slightly concave surface having excellent, low gloss paintability after about 6–8 hours drying at 70–90° F. and relative humidity not in excess of 60%. At such time sufficient of the shrinkage of the caulk is finished so that the subsequently-applied paint film will not be disrupted. Curing of the caulk at higher humidity conditions will require longer periods of time. Higher humidity tends to give a glossier, less paintable surface, which can be corrected by increasing the ratio of the polybutene to conventional aqueous latex caulk plasticizers toward the higher end of the stated range.

A special problem in caulking is the finishing of gaps and structural angles as inside corners in drywall construction and other corners that are to be struck (pressed or scraped) with a tool, and particularly those that are to be caulked rapidly and painted in a relatively short time thereafter as in the production of building modules in a shop. Gypsum wall board, various fiberboards, papers and woods are known to be dimensionally unstable from temperature and/or humidity. Additionally, when units are assembled or partially assembled in a shop with the caulked corners, then transported to a site for final installation, they are subject to various other motions (often called "wracking" or "racking"), which can cause defects in the caulk or the painted surface thereof. We find that our caulks for solving this problem, particularly in modular construction units, should have, in addition to good flexibility and paintability, a fast skinning to accept the paint in a relatively short time and good toolability upon application with clean and sharp break so that a virtually perfect joint can be struck economically and cleanly. Such caulk should not stick to the striking tool, nor give running, stretching or stringiness. Skinning in about 30 minutes drying time is about optimum. Substantially faster than that leads to poor tooling. Slower skinning time gives a poor surface for prompt paint application that may rupture with such application.

Our caulk for such service contains 10–15% latex solids, 55–70% filler constituents, 10–14% volatile constituents, and 10–15% of plasticizer constituents. The calcium carbonate to silica weight ratio is richer on the silica side, being now between about 0.6:1 and about 0.7:1. Because of the heavier body of such caulk, we find it advantageous to mix the ingredients under reduced pressure of 20–29 inches mercury vacuum for at least five and generally 10 minutes or a little longer but not so long as to dry out the caulk excessively. It is rare that mixing of a batch under such vacuum beyond 20 minutes is necessary or desirable. This procedure eliminates air bubbles, densifies the mixture desirably, and provides such caulk with improved texture upon drying.

The following examples show ways in which our invention has been practiced, although they should not be construed as limiting the invention. In this specification all percentages are weight percentages, all parts are parts by weight, and all temperatures are in degrees Fahrenheit unless otherwise expressly noted. Sieve gradings are for the U.S. Standard Sieve series.

EXAMPLE 1

A caulk was made by charging and mixing at 70–120° over about a two-hour period the following batch using a paddle mixer having stationary fingers.

| Ingredients: | Parts |
|---|---|
| Polybutene [1] | 11.10 |
| Silica flour <300 mesh | 18.48 |
| Calcium carbonate [2] | 32.20 |
| Pigmentary $TiO_2$ | 0.46 |
| Wetting agent [3] | 0.77 |
| 1-(3 - chloroallyl)-3,5,7-triaza-1-azonia-adamantane chloride (bacteriostat) | 0.02 |
| Dipropylene glycol dibenzoate | 4.63 |
| Octylphenoxyethanol containing about 40 mols of ethylene oxide per mol of octylphenol (surfactant) 70% by weight in water | 0.62 |
| Aqueous acrylic latex emulsion [4] | 30.80 |
| Mineral spirits [5] | 0.92 |

[1] Viscosity 219–225 centistokes at 100° F., flash point, C.O.C. 310° F. min., 32–35 API gravity at 60° F., typical average mol. weight 445, typical pour point −30° F., typical density 7.136 pounds per gallon, typical refractive index, N20/D 1.4780—"Indopol L-100, a trademark of Amoco Chemicals Corporation.
[2] Typical particle size range 1–20 microns, average particle size 5 microns, oil absorption (rub-out) 9–10.
[3] A complex glassy phosphate in which part of the sodium cations of sodium hexametaphosphate have been replaced by zinc. A fine white powder having pH in 1% water solution of 7.8, 5% maximum solubility in water, <80 mesh— "Calgon Composition T," Calgon Corporation.
[4] Designed for caulks and sealants. Weight per gallon 8.9 pounds, average non-volatile content by weight 55%, pH 4.5. Preponderantly polymerized ethylacrylate—"Rhoplex LC-40," a trademark of Rohm & Haas Company.
[5] A neutral petroleum naphtha having Saybolt Color of 30 max., specific gravity of 0.7818–0.8017, Kauri-Butanol value of 36.5–40, Straight Aniline Point 125–136° F., flash point (T.O.C.) of 100–115° F., I.B.P. 295–331° F., and Dry Point 373–410° F.

This caulk was especially useful for general exterior sealing applications such as window and door frames, etc. Recovery in the flexure test between glass and metal previously described was 85–95% at 75°. Usually this caulk is applied as a bead at a joint to be sealed by use of pressure as from a caulking gun cartridge or other pressurized conventional applicator. When applied at ambient conditions of 70–90° F. and relative humidity below 60%, sufficient of the shrinkage is over for painting in 6–8 hours, and this caulk provides the low-gloss, readily paintable surface with insignificant extraction of components into most conventional paint films (aqueous latex or solvent-base paints). The deposit is sufficiently adherent and flexible to resist ordinary dimensional changes in the resulting structure or structural modules from climatic variations or from racking in transit to the job site.

EXAMPLE 2

A caulk was made by charging and mixing at 70–120° over about a two-hour period the following batch using a dough mixer equipped with evacuation apparatus. The ingredients were the same kind as those shown in Example 1.

| Ingredients: | Parts |
|---|---|
| Polybutene | 8.530 |
| Silica flour | 37.330 |
| Calcium carbonate | 24.810 |
| Pigmentary $TiO_2$ | 0.350 |
| Zincated sodium hexametaphosphate wetting agent | 0.590 |
| Halogenated bacteriostat | 0.016 |
| Dipropylene glycol dibenzoate | 3.500 |
| Octylphenoxyethanol surfactant | 0.474 |
| Acrylic latex emulsion | 23.700 |
| Mineral spirits | 0.700 |

When all the batch had been so charged and mixed, the mixer sealed and evacuated to a vacuum of 28 inches mercury while mixing contained for about 10–15 minutes, until a sample showed pounds per gallon density of 13.5 and the batch thus was finished.

This caulk was especially useful for sealing inside corner joints in conventional gypsum board drywall construction. Recovery in the flexure test between glass and metal previously described was 80% at 75°. Such caulk ordinarily is applied as a bead to the joint to be sealed by use of pressure from a caulking gun cartridge or other pressurized conventional applicator. Then the bead is pressed into the joint with a rubber wiping tool to fill the joint and wipe off excess caulk, leaving a cleanly-sealed joint. When applied at ambient conditions like those of Example 1, the instant caulk exhibits initially clean and sharp tool ability without sticking to the tool, nor running, stretching or stringiness. After about 30 minutes drying time sufficient of the shrinkage is over for painting and this caulk deposit provides a low-gloss, readily paintable surface with insignificant extraction of components into most conventional paint films (aqueous latex or solvent-type base paints). The deposit is sufficiently adherent and flexible to resist ordinary dimensional changes in the resulting structure or in prefabricated structural modules because of climatic conditions or from racking in transit to a job site.

What is claimed is:

1. A plasticized aqueous acrylic latex caulk having improved paintability, comprising an acrylic latex, from about 45–75 weight percent of a solid filler and as a plasticizer ingredient, a polybutene having an average molecular weight within the range of about 400–500, a viscosity within the range of about 150–300 centistokes at 100° F., and a pour point not substantially higher than about −20° F., said polybutene consisting of about 60–80 weight percent of total plasticizer present.

2. The caulk defined in claim 1 wherein the ingredients are present in proportions within the following ranges:

| | Weight percent |
|---|---|
| Latex solids | 10–20 |
| Solid filler | 45–70 |
| Volatiles | 10–18 |
| Plasticizer | 10–20 | and wherein said polybutene constitutes about 65–75 percent of total plasticizer.

3. The caulk defined in claim 1 having properties designed for general sealing applications, wherein the ingredients are present in proportion within the following ranges:

| | Weight percent |
|---|---|
| Latex solids | 15–20 |
| Solid filler | 45–55 |
| Volatiles | 10–14 |
| Plasticizer | 10–50 |

4. The caulk defined in claim 1 having properties designed for sealing structural corners, wherein the ingredients are present in proportions within the following ranges:

| | Weight percent |
|---|---|
| Latex solids | 10–15 |
| Solid filler | 55–70 |
| Volatiles | 10–14 |
| Plasticizer | 10–15 |

5. The caulk of claim 4 produced by mixing the constituents under reduced pressure of at least 20 inches mercury vacuum for 5–20 minutes.

References Cited

UNITED STATES PATENTS

| 3,554,942 | 1/1971 | Zdanowski et al. | 260—17 R |
| 3,637,556 | 1/1972 | Brillinger | 260—23.7 M |

FOREIGN PATENTS

| 1,006,203 | 9/1965 | Great Britain | 260—29.6 PS |

OTHER REFERENCES

Huff, Lee A.: Adhesive Age, 10(5), pp. 27–29 (May 1967).

WILLIAM H. SHORT, Primary Examiner

L. M. PHYNES, Assistant Examiner

U.S. Cl. X.R.

117—161 A; 156—327; 260—29.6 PS, 29.7 UA, 33.6 UA, 41 AC